United States Patent
Park et al.

(10) Patent No.: US 10,474,491 B2
(45) Date of Patent: Nov. 12, 2019

(54) METHOD AND APPARATUS FOR MANAGING CLOUD SERVER IN CLOUD ENVIRONMENT

(71) Applicant: TMAXSOFT. CO., LTD., Seongnam-si, Gyeonggi-do (KR)

(72) Inventors: Sangmin Park, Yongin-si (KR); Hee-Jin Lee, Seoul (KR)

(73) Assignee: TMAXSOFT. CO., LTD., Seongnam-si (KR)

(*) Notice: Subject to any disclaimer, the term of this patent is extended or adjusted under 35 U.S.C. 154(b) by 127 days.

(21) Appl. No.: 15/662,857

(22) Filed: Jul. 28, 2017

(65) Prior Publication Data

US 2019/0026139 A1   Jan. 24, 2019

(30) Foreign Application Priority Data

Jul. 21, 2017   (KR) .................. 10-2017-0092685

(51) Int. Cl.

| | | |
|---|---|---|
| *H04L 12/24* | (2006.01) | |
| *G06F 9/455* | (2018.01) | |
| *H04L 29/08* | (2006.01) | |
| *G06F 11/30* | (2006.01) | |
| *G06F 16/182* | (2019.01) | |
| *G06F 9/445* | (2018.01) | |
| *G06F 9/50* | (2006.01) | |

(52) U.S. Cl.
CPC ...... *G06F 9/45558* (2013.01); *G06F 9/44505* (2013.01); *G06F 9/50* (2013.01); *G06F 11/3006* (2013.01); *G06F 11/3051* (2013.01); *G06F 11/3093* (2013.01); *G06F 16/182* (2019.01); *H04L 41/0806* (2013.01); *H04L 41/5048* (2013.01); *H04L 67/1012* (2013.01); *G06F 2009/4557* (2013.01); *G06F 2009/45562* (2013.01); *H04L 41/0889* (2013.01); *H04L 41/0896* (2013.01); *H04L 41/5025* (2013.01); *H04L 41/5096* (2013.01); *H04L 67/1029* (2013.01)

(58) Field of Classification Search
CPC . G06F 9/45; G06F 11/30; H04L 41/08; H04L 41/50
USPC ........................................................ 709/223
See application file for complete search history.

(56) References Cited

U.S. PATENT DOCUMENTS

2012/0179904 A1* 7/2012 Dunn .................. G06F 21/6209
                                                                 713/155
2012/0297059 A1* 11/2012 Bross .................. G06F 11/3006
                                                                 709/224

(Continued)

FOREIGN PATENT DOCUMENTS

| KR | 10-2014-0076956 | 6/2014 |
| KR | 10-1474872 B1 | 12/2014 |

*Primary Examiner* — Glenford J Madamba
(74) *Attorney, Agent, or Firm* — Novick, Kim & Lee, PLLC; Sang Ho Lee

(57) ABSTRACT

Provided is a method for managing a cloud server by using a manager server in a cloud environment, the method including receiving server template information of a first cloud server in a cloud domain, to which the manager server pertains, from the first cloud server, generating server setting information for a cloud server in the cloud domain based on the server template information of the first cloud server, and transmitting the server setting information for the cloud server to the first cloud server to drive the first cloud server.

18 Claims, 3 Drawing Sheets

(56) References Cited

U.S. PATENT DOCUMENTS

| | | | |
|---|---|---|---|
| 2012/0311579 A1* | 12/2012 | Lee | G06F 9/45558 |
| | | | 718/1 |
| 2013/0086236 A1* | 4/2013 | Baucke | H04L 45/50 |
| | | | 709/223 |
| 2016/0191320 A1 | 6/2016 | Hintermeister et al. | |
| 2018/0336027 A1* | 11/2018 | Narayanan | G06F 8/61 |

* cited by examiner

METHOD AND APPARATUS FOR MANAGING CLOUD SERVER IN CLOUD ENVIRONMENT

CROSS-REFERENCE TO RELATED APPLICATIONS

A claim for priority under 35 U.S.C. § 119 is made to Korean Patent Application No. 10-2017-0092685 filed on Jul. 21, 2017, in the Korean Intellectual Property Office, the entire contents of which are hereby incorporated by reference.

BACKGROUND

Embodiments of the inventive concept described herein relate to a method and an apparatus for managing a cloud server in a cloud environment.

A cloud system refers to a computing system that may use IT related services at once, such as storage of data, networks, and use of content, through a server on the Internet. In other words, it refers to a computing environment in which information is permanently stored in a server on the Internet and is temporarily stored in a client such as IT devices, such as a desktop PC, a tablet PC, a notebook, a netbook, and a smartphone. That is, it is a concept of storing all information of the user in a server on the Internet and using the information through various IT devices in any place or situation.

In other words, the cloud system provides a computing service for borrowing computing resources, such as software, which exists like cloud as much as the user likes and paying costs for the computing resources, and refers to a technology of integrating the computing resources existing at different physical locations with a virtualization technology and providing the integrated computing resources.

In recent years, as the cloud systems have been increasingly used, processes of freely scaling out and in servers have been frequently performed in the cloud systems. Accordingly, a measure for dynamically scaling out and in a server in a cloud system is necessary. Further, a measure for dynamically processing and managing the setting of the servers when the server is scaled out and in in the cloud system is also necessary.

SUMMARY

Embodiments of the inventive concept provide a method for managing one or more cloud servers by using a manager server in a cloud environment.

Embodiments of the inventive concept also provide a manager server that may dynamically manage a process of scaling out and in a cloud server in a cloud environment.

Embodiments of the inventive concept also provide a cloud system that may dynamically updating setting of a cloud server by exchanging setting information of the cloud server through a manager server in a cloud environment, and a method for managing a cloud server.

In accordance with an aspect of the inventive concept, there is provided a method for managing a cloud server by using a manager server in a cloud environment, the method including receiving server template information of a first cloud server in a cloud domain, to which the manager server pertains, from the first cloud server, generating server setting information for a cloud server in the cloud domain based on the server template information of the first cloud server, and transmitting the server setting information for the cloud server to the first cloud server to drive the first cloud server.

In an embodiment, the server template information of the first cloud server may include information that indicates a server template, which is to be applied to the first cloud server, among server templates stored in the manager server in advance.

In an embodiment, the manager server may have static IP address information in the cloud domain, and the method may further include dynamically allocating an IP address to the first cloud server when the first cloud server is booted.

In an embodiment, the method may further include, by the first cloud server, transmitting at least one of the server template information of the first cloud server and IP address information of the first cloud server to the manager server based on the static IP address information of the manager server.

In an embodiment, the generating of the server setting information for the cloud server may include extracting a server template from the server templates stored in the manager server in advance based on the received server template information of the first cloud server, and updating server setting information, which is to be applied to the first cloud server, based on the extracted server template.

In an embodiment, the updating of the server setting information may include updating server setting information of the cloud server pertaining to the domain and distinguished from the first cloud server together.

In an embodiment, the method may further include transmitting the updated server setting information for the cloud server to cloud servers in the cloud domain.

In an embodiment, the driving of the first cloud server may include booting the first cloud server based on the server setting information, which is to be applied to the first cloud server, to execute an application that is necessary for driving of the first cloud server.

In an embodiment, the method may further include receiving status information that changes as the first cloud server is driven, from the first cloud server.

In an embodiment, the method may further include, by the manager server, monitoring connection statuses of cloud servers in the cloud domain, when a second cloud server pertaining to the cloud domain is determined to disconnected, based on the monitoring result, deleting server setting information of the second cloud server to update the server setting information for the cloud server in the cloud domain, and transmitting the updated server setting information to the cloud server in the cloud domain.

In accordance with another aspect of the inventive concept, there is provided a manager server that provides a method for managing a cloud server in a cloud environment, the manager server including a server setting unit configured to receive server template information of a first cloud server in a cloud domain, to which the manager server pertains, from the first cloud server to generate server setting information for the first cloud server in the cloud domain based on the server template information of the first cloud server, and a control unit configured to transmit the server setting information for the cloud server to the first cloud server to drive the first cloud server.

In an embodiment, the manager server may further include a storage unit configured to store a plurality of server templates, and the server setting unit extracts a server template among the plurality of server templates from the storage unit based on the server template information received from the first cloud server to generate the server setting information.

In an embodiment, the server setting unit may update server setting information for a cloud server pertaining to the domain and distinguished from the first cloud server.

In an embodiment, the first cloud server may correspond to a cloud server firstly connected to the domain, and the control unit may provide an application that is necessary for driving of the first cloud server in response to a request of the first cloud server, after the first cloud server is booted based on the generated server setting information.

In accordance with another aspect of the inventive concept, there is provided a cloud system that provides a method for managing a cloud server in a cloud environment, the cloud system including a cloud server pertaining to a cloud domain, to which a manager server pertains, and configured to transmit server template information that indicates a server template to the manager server, and a manager server configured to generate server setting information for a cloud server in the cloud domain based on the server template information received from the cloud server, and to transmit the server setting information for the cloud server to the cloud server to drive the cloud server.

In an embodiment, the manager server may manage one or more server templates, and generates the server setting information based on a server template extracted based on the server template information.

In an embodiment, the manager server may monitor connection statuses of cloud servers in the domain to update the server setting information.

In an embodiment, the cloud server may transmit IP information allocated to the cloud server together with the server template information in response to an inquiry requested based on monitoring of a connection status of the manager server.

In an embodiment, the manager server may monitor the connection statuses of the cloud servers to update the server setting information including disconnection information of a cloud server of which a connection status is not identified.

The inventive concept includes a program stored in a medium to execute the method according to an embodiment of the inventive concept in a computer.

In accordance with an aspect of the inventive concept, there is provided a computer readable recording medium in which a program for executing the method according to an embodiment of the inventive concept is recorded.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
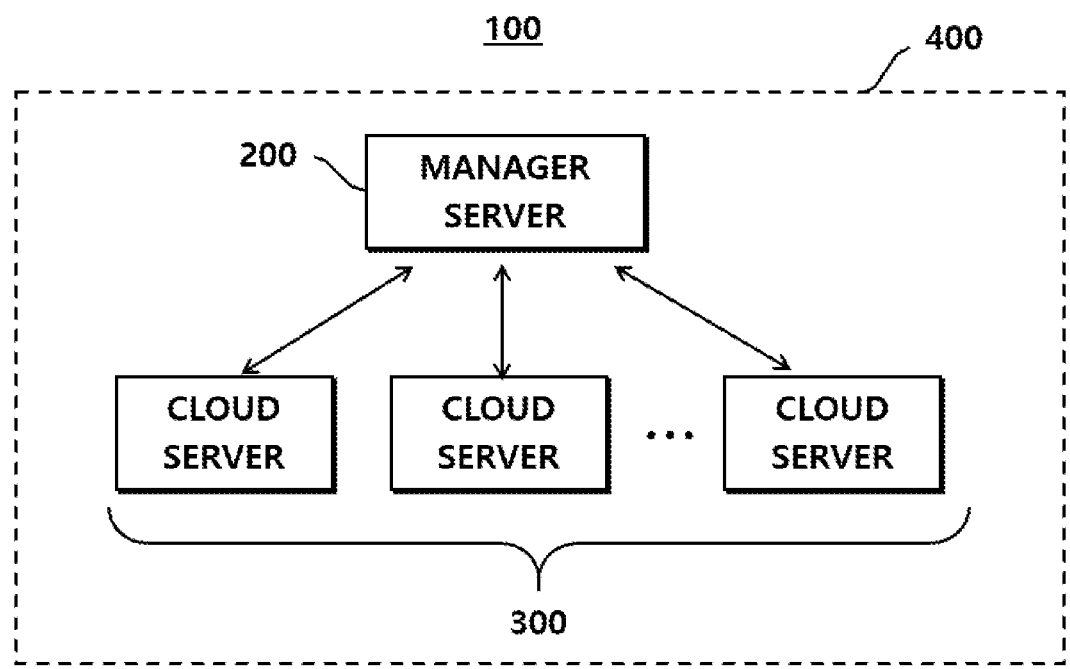
FIG. 1 is a view illustrating a schematic configuration of a cloud system according to an embodiment of the inventive concept.

Hereinafter, exemplary embodiments of the inventive concept will be described in detail with reference to the accompanying drawings to make the technical spirit of the inventive concept clear. In the description of the inventive concept, a detailed description of related known functions and elements will be omitted when it may make the subject matter of the inventive concept unnecessarily obscure. The same reference numerals are given to the elements having substantially the same functional configurations even though the elements are illustrated in different drawings. For convenience of description, an apparatus and a method are described together if necessary.

FIG. 1 is a view illustrating a schematic configuration of a cloud system according to an exemplary embodiment of the inventive concept.

Referring to FIG. 1, the cloud system 100 according to the exemplary embodiment of the inventive concept is adapted to provide a method for managing a cloud server in a cloud environment, and may include one manager server 200 and one or more cloud servers 300. In the cloud system 100, one manager server 200 and one or more cloud servers 300 may constitute a unit for a logical domain 400. The user may actually manage a cloud service in unit of the domain 400.

The manager server 200 is a server that manages cloud servers 300 in the domain 400, and may be connected to the cloud servers 300 to monitor and manage the statuses of the cloud servers 300. In an embodiment, the manager server 200 may perform a scale-out process of adding a new cloud server in the domain 400, and may perform a scale-in process of deleting Scale-out cloud server in the domain 400. The detailed operational processes thereof will be described below. According to an embodiment, one domain 400 may include one or more manager servers 200.

The one or more cloud servers 300 are servers that provide a cloud service to the client, and may be added or deleted in the domain 400 according to situations.

The manager server 200 has unique IP address information on the domain 400. The cloud server 300 has dynamic IP address information that is not statically determined, and an IP address may be dynamically allocated on the domain 400. When a plurality of cloud servers 300 are connected to each other in the domain 400, different IP addresses may be allocated to the cloud servers 300.

Figure 2:
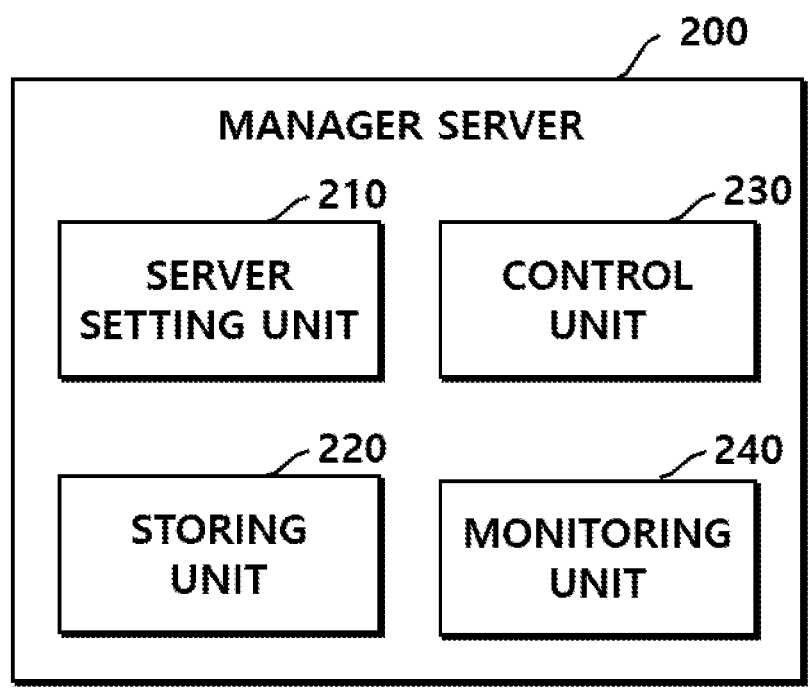
FIG. 2 is a block diagram illustrating a manager server that provides a method for managing a cloud server in a cloud system in an embodiment of the inventive concept.

FIG. 2 is a block diagram illustrating a manager server that provides a method for managing a cloud server in a cloud system in an exemplary embodiment of the inventive concept.

Referring to FIG. 2, the manager server 200 according to the embodiment of the inventive concept is a server that manages a cloud server 300 in the domain 400 on the above-mentioned cloud system 100, and may include a server setting unit 210, a storage unit 220, a control unit 230, and a monitoring unit 240.

The server setting unit 210 may generate server setting information in the form of a server template in advance and may store the server setting information in the storage unit 220. The server setting information may include information, which is necessary to drive and manage a cloud server, such as the type of a web application server applied to the cloud server, server API information, information that is necessary when the cloud server is operated in a Java environment (for example, Java virtual machine (JVM) information, agent information, and so on), and information for setting Java program components.

For example, the server setting information may include various information, which will be used in the server, such as Enterprise JavaBean (EJB) engine information, Java Message Service (JMS) engine information, and servlet engine information, and may include overall information, which is necessary for a Java environment, such as a listener, a connector, a logging, and so on.

The server setting unit 210 may constitute different pieces of server setting information and generate server templates corresponding to the pieces of server setting information. As an embodiment, the server setting unit 210 may variously designate information, which will be set in the cloud server, such as the type of a web application server, server API information, and information that is necessary when the cloud sever 300 is managed in the Java environment, according to a management purpose of the cloud server 300 in the domain 400, and the setting information may be generated and managed by using server templates. Accordingly, in the inventive concept, because multiple server templates having different server setting information may be configured, the cloud servers 300 having different settings may be easily configured and managed in the domain 400.

The server setting unit 210 may generate server setting information. In this case, the server setting information may be designated by generating a new server template, or alternatively, new server setting information may be designated by correcting, amending, or deviating an existing server template. According to an embodiment of the inventive concept, a cloud server already driven by an existing server template may not be influenced by corrected, amended, or deviated server setting information even though the server template is corrected, amended, or deviated and may be driven according to server setting information designated based on an existing server template. When a new server template is to be applied or a corrected server template is to be applied, new server setting information may be applied by operating the cloud server again and driving a new Java virtual machine.

The storage unit 220 may store and manage a server template generated by the server setting unit 210. For example, the storage unit 220 may create a server template generated by the server setting unit 210 as a server template file and store the server template file. According to an embodiment, a plurality of server templates may be stored as a plurality of server template files.

According to an embodiment, the storage unit 220 may store dynamic IP addresses of the cloud servers 300 in the domain 400 and manage the dynamic IP addresses. As the IP addresses of the cloud servers 300 are managed, the control unit 230 may transmit updated server setting information to the plurality of cloud servers 300 when the server setting information is updated or changed. The storage unit 220 may store and manage the status information of the cloud servers 300.

The control unit 230 controls overall operations of the elements of the manager server 200. According to an embodiment, the control unit 230 may control an operation of a cloud server that is newly moved in or moved out in the domain 400. In an embodiment, the control unit 230 may perform a control such that the cloud server newly added in the domain 400 is driven according to server setting information.

According to an embodiment, the control unit 230 may include a communication unit to communicate with the cloud servers 300 in the domain 400. The control unit 230 may communicate with the cloud servers 300 based on the IP information of the cloud servers 300 recorded in the storage unit 220.

Further, the control unit 230 may determine connection status of the cloud servers in the domain 400 and may reflect information that server setting information for the disconnected cloud server is deleted or the corresponding cloud server is disconnected on server setting information delivered to other cloud servers. The connection status of the cloud servers may be determined based on a monitoring result of the monitoring unit 240.

The monitoring unit 240 may monitor connection statuses of all the cloud servers in the domain 400. According to an embodiment, a cloud server newly moved in the domain 400 may transmit its status information to the monitoring unit 240 when being driven according to server setting information, and the monitoring unit 240 may identify a connection status of the cloud server by receiving the status information of the cloud server. Then, the manager server 200 may store status information of the cloud server received from the cloud server in the storage unit 220.

Figure 3:
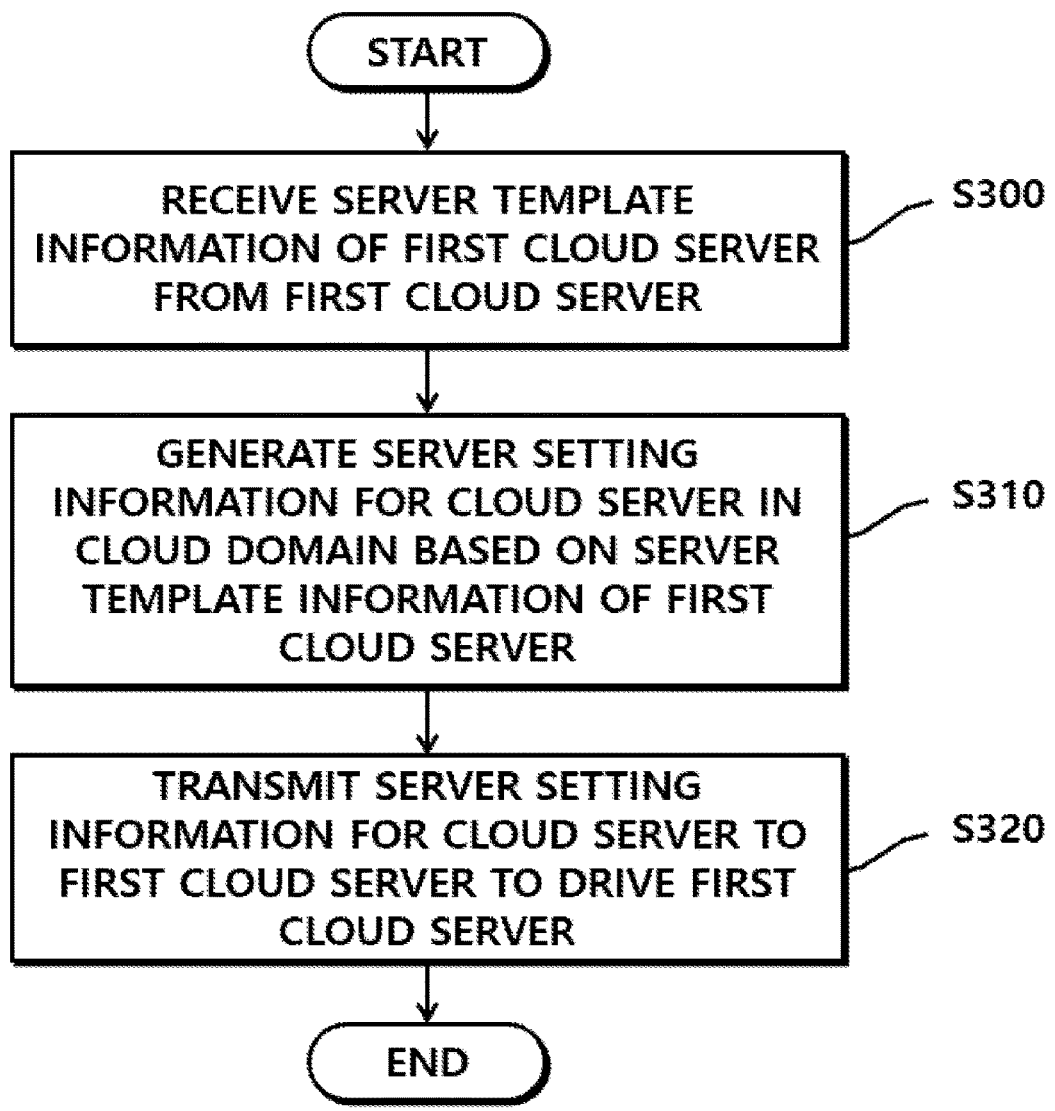
FIG. 3 is a flowchart for explaining a method for managing a cloud server in a cloud environment according to an embodiment.

According to an embodiment, the monitoring unit 240 may monitor the connection statuses of the cloud severs in the domain 400 at a predetermined time interval. For example, the monitoring unit 240 may monitor the connection statuses of the cloud servers at an interval of 0.5 to 1 second. FIG. 3 is a flowchart for explaining a method for managing a cloud server in a cloud environment according to an exemplary embodiment. The method illustrated in FIG. 3 may be performed by the above-mentioned manager server 200 of the cloud system 100 of FIGS. 1 and 2. Further, a first cloud server described below is a cloud server pertaining to the cloud server in which the manager server 200 is included, and may be included in the cloud server 300 of FIG. 1. The first cloud server may also include one or more cloud servers.

Referring to FIG. 3, the method for managing a cloud server in a cloud environment according to the exemplary embodiment of the inventive concept may include an operation of receiving server template information of a first cloud server in a cloud domain 400, to which a manager server 200 pertains, from the first cloud server (S300), an operation of generating server setting information for a cloud server in the cloud domain 400 based on the server template information of the first cloud server (S310), and an operation of transmitting the server setting information for the cloud server in the cloud domain 400 to the first cloud server to drive the first cloud server (S320).

For example, the first cloud server may be a cloud server newly added in the domain 400.

Further, in the method for managing a cloud server in a cloud environment according to the exemplary embodiment of the inventive concept, a scale-in process of deleting a cloud server in the cloud domain 400, to which the manager server 200 pertains, may be performed.

Hereinafter, a scale-out process and a scale-in process of a cloud server in a cloud environment will be described in detail with reference to FIGS. 4 and 5.

Figure 4:
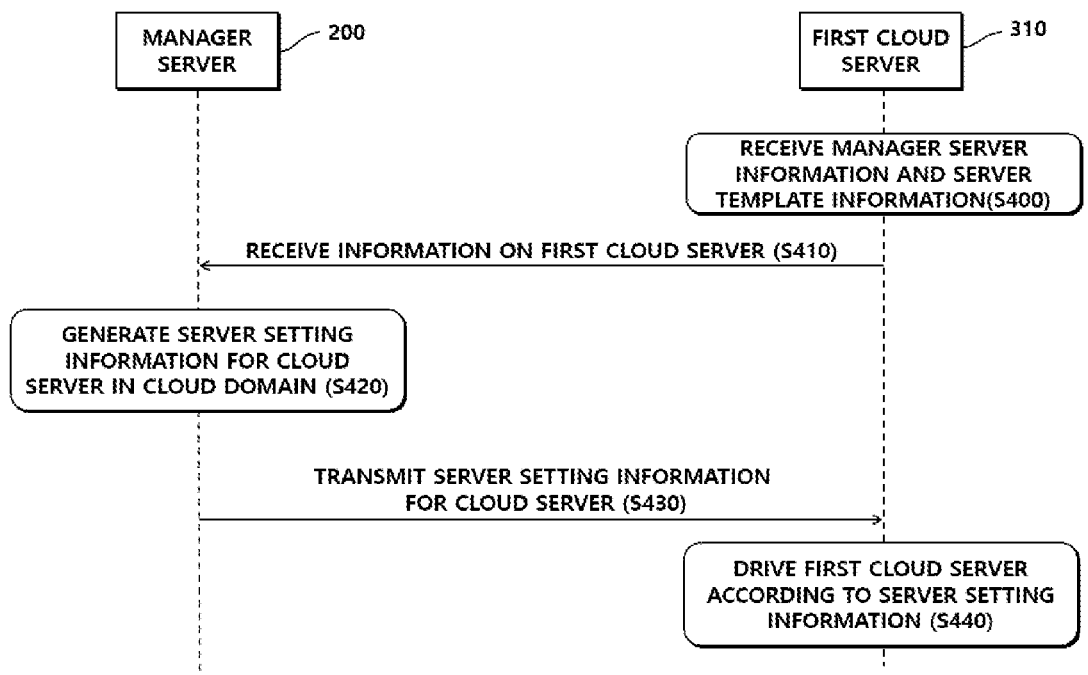
FIG. 4 is a sequence diagram for explaining a scale-out process of newly scaling out a cloud server on a cloud system according to an embodiment of the inventive concept.

FIG. 4 is a sequence diagram for explaining a scale-out process of adding a cloud server on a cloud system which is newly connected to the domain according to an embodiment of the inventive concept. The processes of FIG. 4 may be performed by the above-mentioned manager server 200 of the cloud system 100 of FIGS. 1 and 2.

Referring to FIG. 4, the first cloud server 310 newly moved in the cloud domain 400, to which the manager server 200 pertains, the first cloud server 310 newly connected to the manager server 200 may receive manager server information and server setting information (S400). The first cloud server 310 may be included in the plurality of cloud servers 300 illustrated in FIG. 1.

In an embodiment, the first cloud server 310 may be driven by a specific machine (for example, a Java virtual machine), and cannot know its IP address information before the machine is driven. When the first cloud server 310 is booted for the first time to be newly scaled out in the cloud domain 400, a server image for a cloud may be used. The server image for a cloud server may include a library file and an execution file that are necessary for driving a server. Accordingly, after being booted through execution of a server image for a cloud, the first cloud server 310 may receive manager server information and server setting information in the cloud domain 400 to execute an operation that is necessary for setting of the server through the manager server 200.

For example, as described above, because the manager server 200 uses a static IP address in the cloud domain 400, the first cloud server 310 may receive the static IP address of the manager server 200 as manager server information. For example, the manager server information may include the static IP address of the manager server 200.

As described above, because the server setting unit 210 of the manager server 200 generates and stores the server setting information in the form of a server template, the first cloud server 310 may receive information that indicates a server template, which is to be applied to the first cloud server 310, among the server templates stored in the manager server 200, as server template information.

The manager server 200 receives information regarding the first cloud server 310 from the first cloud server 310 (S410). In this case, the first cloud server 310 may receive the static IP address of the manager server from an exterior during booting to communicate with the manager server 200. Accordingly, the first cloud server 310 may transmit information regarding the first cloud server 310 to the static IP address of the manager server 200, and the manager server 200 may receive the information.

The information regarding the first cloud server may include server template information that indicates server template to be applied to the first cloud server 310 and IP address information of the first cloud server. In an embodiment, the first cloud server 310 cannot know its IP address before the machine is driven, but may be connected in the cloud domain 400 during booting such that an IP address may be dynamically allocated during booting. Accordingly, the first cloud server 310 may transmit its dynamically allocated IP address information to the manager server 200, and the manager server 200 that received the IP address information may recognize IP address information of the first cloud server. According to the inventive concept, because the manager server 200 may recognize IP address information of the cloud servers 300 newly scaled out in the cloud domain 400 in advance, the manager server 200 may easily scaling out or in the one or more cloud servers 300 by allowing mutual communication between the cloud servers 300. Further, as described above, the server setting information, which is to be applied to the first cloud server 310, may correspond to a server template. The server template may be identified among the server templates stored in the manager server 200 by server template information.

The manager server 200 generates server setting information for the cloud server 300 in the cloud domain 400 based on the information received from the first cloud server 310 (S420) As described above, the information received from the first cloud server 310 may include server template information (a server template name) of the first cloud server 310 and IP address information of the first cloud server. According to an embodiment, the server setting information for the cloud server 300, which is generated by the manager server 200, may include the server setting information for the scaled-out first cloud server 310 to include server setting information for other cloud servers included in the domain 400.

In more detail, the server setting unit 210 of the manager server 200 may extract a server template, which corresponds to the server template information of the first cloud server 310 received from the first cloud server 310, among the server templates stored in advance, from the storage unit 220. Next, the server setting unit 210 of the manager server 200 may generate server setting information, which will be applied to the first cloud server 310, based on the extracted server template. According to an embodiment, the server setting information, which will be applied to the first cloud server 310 generated by the server setting unit 210, may be substantially the same as the server template extracted from the storage unit 220.

Then, the server setting unit 210 of the manager server 200 may update the server setting information for all the cloud servers 300 in the cloud domain 400 including server setting information, which will be applied to the first cloud server 310. As an example, the server setting information for the cloud server 300 may be recorded in a setting file to be generated.

The manager server 200 may transmit the server setting information for the cloud server 300 in the cloud domain 400 to the first cloud server 310 (S430) and may allow the first cloud server 310 to be driven according to the server setting information (S440).

In an embodiment, the control unit 230 of the manager server 200 may apply server setting values such that the first cloud server 310 is booted according to the server setting information, which will be applied to the first cloud server 310 included in the server setting information for the cloud server 300, and then may execute a process that is necessary for driving of the first cloud server 310.

The first cloud server 310 may receive the server setting information for the cloud server 300 to extract server setting values, which will be applied during booting, and may complete booting of the server by applying the extracted server setting values. For example, the first cloud server 310 may extract server setting values, such as an option for the Java virtual machine or an option for an agency to apply the server setting values during booting of the Java virtual machine.

After the booting is completed according to the server setting information, the first cloud server 310 may request an application that is necessary for actual driving of the first cloud server 310 from the manager server 200 to execute the application, and accordingly, may start normal driving of the server.

The first cloud server 310 may transmit status information that changes as the server is booted or status information that changes as the server is driven, to the manager server 200 and the manager server 200 that received the status information may store the status information of the first cloud server 310 in the storage unit 220. Accordingly, because the manager server 200 may recognize a current booting progress situation or a driving status of an application through the status information of the first cloud server 310, the scale-out process of the first cloud server 310 may be easily controlled.

The manager server 200 may transmit the server setting information for the cloud server 300 to all the cloud servers 300 in the cloud domain 400. The cloud servers 300 in the domain 400, which received the server setting information, may recognize the updated server setting information. If server setting information for a cloud server is updated, the corresponding server may drive a server according to the updated server setting information.

Although it has been described in the embodiment that the manager server 200 receives information for the first cloud server 310 from the first cloud server 310, it is a simple example. In another embodiment of the inventive concept, the manager server 200 may monitor connection statuses of the cloud servers 300 in the cloud domain 400, and through this, may recognize a cloud server newly connected in the cloud domain 400. In this case, the manager server 200 may request the newly scaled-out cloud server to transmit server information (for example, server template information and IP address information of a server). Further, the manager server 200 may monitor connection statuses of the cloud servers in the cloud domain 400 to recognize a cloud server newly disconnected in the cloud domain 400. In this case, the manager server 200 may update the server setting information reflecting the disconnected cloud server. In other words, according to an embodiment of the inventive concept, when the manager server 200 finds a cloud server, a connection status of which is changed through monitoring, it may update server setting information for all the cloud servers in the cloud domain 400 by adding or deleting the server setting information for the cloud server, the connection status of which has been changed.

Figure 5:
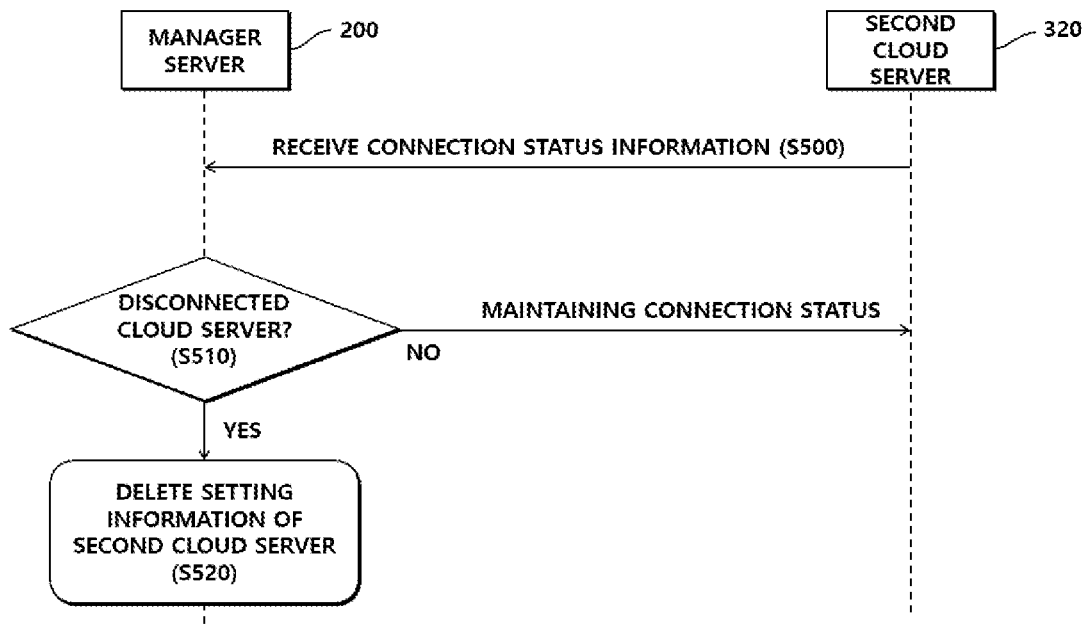
FIG. 5 is a sequence diagram for explaining a scale-in process of scaling in a cloud server on a cloud system according to an embodiment of the inventive concept.

FIG. 5 is a sequence diagram for explaining a scale-in process which is deleting a cloud server on a cloud system according to an exemplary embodiment of the inventive concept. The processes of FIG. 5 may be performed by the above-mentioned manager server 200 of the cloud system 100 of FIGS. 1 and 2.

Referring to FIG. 5, the manager server 200 may monitor connection statuses of the cloud servers in the cloud domain 400 (S500). For example, the manager server 200 may monitor the connection statuses of all the cloud servers 300 in the cloud domain 400.

In an embodiment, as described above, the monitoring unit 240 of the manager server 200 may receive status information from all the cloud servers 300 in the cloud domain 400, and may identify the connection statuses of the cloud servers 300 based on the received status information.

The manager server 200 may determine whether a cloud server, which is not connected, among the cloud servers 300 in the cloud domain 400 exists, based on the monitoring result (S500).

In an embodiment, when the manager server 200 receives connection status information on exceptional handling that occurs when the connection of a cloud server is failed, that is the cloud server is not able to reach from the manage server 200, the control unit 230 of the manager server 200 may determine that the corresponding cloud server is disconnected in the cloud domain 400. In another embodiment, the control unit 230 of the manager server 200 may periodically execute health checks to determine whether a cloud server, which is not connected, among the cloud servers 300 in the cloud domain 400 exists. If a cloud server that fails in health check exists, the control unit 230 of the manager server 200 may determine that the corresponding cloud server is disconnected in the cloud domain 400.

If the control unit 230 of the manager server 200 determines that the second cloud server 320 in the cloud domain 400 is disconnected and scaled in in operation S510, the control unit 230 of the manager server 200 may delete the server setting information of the second cloud server 320. The server setting unit 210 of the manager server 200 may delete the server setting information of the second cloud server 320 from the server setting information for the cloud server 300 in the cloud domain 400, and accordingly, may update the server setting information for the cloud server 300.

The manager server 200 may transmit the server setting information for the updated cloud server 300 to the connected cloud servers 300 in the cloud domain 400. The cloud servers 300 in the domain 400, which received the server setting information, may recognize the updated server setting information. For example, if server setting information for a cloud server is updated, the corresponding server may drive a server according to the updated server setting information.

Various embodiments of the inventive concept may be embodied by instructions stored in a computer readable recording medium, which may be read and executed by one or more processors. The computer readable recording medium is a physical medium that stores information, and may include a volatile memory, a nonvolatile memory, an optical storage medium, and a magnetic disk storage medium. Further, various embodiments of the inventive concept may include a computer readable medium in which instructions for performing the above-mentioned methods are recorded.

Further, various embodiments of the inventive concept may be embodied through combination of hardware, firmware, and software.

According to the inventive concept, because server setting information is provided in the form of a server template, server setting information may be dynamically applied to a cloud server by generating or updating server setting information by using a server template without having to generate and apply a new image for a cloud server as in the related art to designate new server setting information.

According to the inventive concept, because multiple server templates having different pieces of server setting information may be constituted, the cloud servers having different server settings may be easily constituted and managed in a cloud domain.

According to the inventive concept, because cloud servers may communicate with each other by using a manager server, a process of scaling out or in may be easily performed through the manager server when a server is newly connected or disconnected in a cloud domain. Further, because the number of servers in a cloud domain may be adjusted through a manager server, the entire cloud system may be easily constituted.

According to the inventive concept, because the cloud servers may communicate each other by using the manager server, server setting information may be dynamically changed to be applied to the cloud servers and thus the entire cloud system may be efficiently managed.

Until now, the exemplary embodiments of the inventive concept, which are illustrated in the drawings, have been described in detail. The embodiments are intended to limit the inventive concept but are simple examples, and should be considered in a limited way but a descriptive way. The genuine technical protection scope of the inventive concept is not determined by the above description but by the technical spirit of the attached claims. Although the specific terms are used herein, they are provided only to describe the inventive concept and are neither intended to limit their meanings nor limit the scope of the inventive concept described in the claims. The operations of the inventive concept need to be performed in the described sequence and may be performed in parallel, optionally, or individually.

It should be understood by an ordinary person skilled in the art to which the inventive concept pertains that various modifications and equivalents may be made without departing from the spirit of the inventive concept. The equivalents include not only the currently known equivalents but equivalents that will be developed in the future, that is, all elements invented to perform the same functions regardless of the structures thereof.

What is claimed is:

1. A method for managing one or more cloud servers by using a manager server in a cloud environment, the method comprising:
   receiving server template information of a first cloud server in a cloud domain, to which the manager server pertains, from the first cloud server;
   generating server setting information for the first cloud server in the cloud domain based on the server template information of the first cloud server; and
   transmitting the server setting information for the first cloud server to the first cloud server to drive the first cloud server,
   wherein the manager server has static IP address information in the cloud domain,
   wherein when the first cloud server is booted for the first time to be newly scaled out in the cloud domain, a server image including a library file and an execution file that are necessary for driving the first cloud server is used,
   wherein the first cloud server is driven by a specific machine, the first cloud server not knowing an IP address thereof before the specific machine is driven,
   wherein the first cloud server is connected to the cloud domain during the booting of the first cloud and the IP address is dynamically allocated to the first cloud server during the booting,
   wherein the first cloud server transmits at least one of the server template information of the first cloud server and information of the dynamically allocated IP address of the first cloud server to the manager server based on the static IP address information of the manager server.

2. The method of claim 1, wherein the server template information of the first cloud server includes:
   information that indicates a server template, which is to be applied to the first cloud server, among a plurality of server templates stored in the manager server in advance.

3. The method of claim 2, wherein the generating of the server setting information for the cloud server includes:
   extracting a server template from the plurality of server templates stored in the manager server in advance based on the server template information received from the first cloud server; and
   updating the server setting information, which is to be applied to the first cloud server, based on the extracted server template.

4. The method of claim 3, wherein the updating of the server setting information includes:
   updating server setting information of a second cloud server distinguished from the first cloud server together, the second cloud server being pertaining to the cloud domain.

5. The method of claim 4, further comprising:
   transmitting the updated server setting information for the second cloud server to the one or more cloud servers in the cloud domain.

6. The method of claim 1, wherein the driving of the first cloud server includes:
   booting the first cloud server based on the server setting information, which is to be applied to the first cloud server, to execute an application that is necessary for driving of the first cloud server.

7. The method of claim 1, further comprising:
   receiving status information that changes as the first cloud server is driven, from the first cloud server.

8. The method of claim 1, further comprising:
   by the manager server, monitoring connection status of the one or more cloud servers in the cloud domain;
   when a second cloud server pertaining to the cloud domain is determined to disconnected, based on the monitoring result, deleting server setting information of the second cloud server to update the server setting information for the one or more cloud servers in the cloud domain; and
   transmitting the updated server setting information to the one or more cloud servers in the cloud domain.

9. A manager server configured to manage a cloud server in a cloud environment, the manager server comprising a processor configured to:
   receive server template information of a first cloud server in a cloud domain, to which the manager server pertains, from the first cloud server to generate server setting information for the first cloud server in the cloud domain based on the server template information of the first cloud server; and
   transmit the server setting information for the first cloud server to the first cloud server to drive the first cloud server,
   wherein the manager server has static IP address information in the cloud domain,
   wherein when the first cloud server is booted for the first time to be newly scaled out in the cloud domain, a server image including a library file and an execution file that are necessary for driving the first cloud server is used,
   wherein the first cloud server is driven by a specific machine, the first cloud server not knowing an IP address thereof before the specific machine is driven,
   wherein the first cloud server is connected to the cloud domain during the booting of the first cloud and the IP address is dynamically allocated to the first cloud server during the booting,
   wherein the first cloud server transmits at least one of the server template information of the first cloud server and information of the dynamically allocated IP address of the first cloud server to the manager server based on the static IP address information of the manager server.

10. The manager server of claim 9, further comprising:
    a storage configured to store a plurality of server templates, wherein the processor extracts a server template among the plurality of server templates from the storage based on the server template information received from the first cloud server to generate the server setting information.

11. The manager server of claim 10, wherein the processor updates server setting information for a second cloud server pertaining to the domain and distinguished from the first cloud server.

12. The manager server of claim 10, wherein the first cloud server corresponds to a cloud server firstly connected to the domain, and wherein the processor provides an application that is necessary for driving of the first cloud server in response to a request of the first cloud server, after the first cloud server is booted based on the generated server setting information.

13. A cloud apparatus configured to manage one or more cloud servers in a cloud environment, the cloud apparatus comprising:
- a first cloud server pertaining to a cloud domain, to which a manager server pertains, and configured to transmit server template information that indicates a server template to the manager server; and
- a manager server configured to generate server setting information for the first cloud server in the cloud domain based on the server template information received from the first cloud server, and to transmit the server setting information for the first cloud server to the first cloud server to drive the first cloud server,
- wherein the manager server has static IP address information in the cloud domain,
- wherein when the first cloud server is booted for the first time to be newly scaled out in the cloud domain, a server image including a library file and an execution file that are necessary for driving the first cloud server is used,
- wherein the first cloud server is driven by a specific machine, the first cloud server not knowing an IP address thereof before the specific machine is driven, wherein the first cloud server is connected to the cloud domain during the booting of the first cloud and the IP address is dynamically allocated to the first cloud server during the booting,
- wherein the first cloud server transmits at least one of the server template information of the first cloud server and information of the dynamically allocated IP address of the first cloud server to the manager server based on the static IP address information of the manager server.

14. The cloud apparatus of claim 13, wherein the manager server manages one or more server templates, and generates the server setting information based on a server template extracted based on the server template information.

15. The cloud apparatus of claim 13, wherein the manager server monitors connection statuses of the one or more cloud servers in the domain to update the server setting information.

16. The cloud apparatus of claim 15, wherein the first cloud server transmits IP information allocated to the first cloud server together with the server template information in response to an inquiry requested based on monitoring of a connection statuses of the manager server.

17. The cloud apparatus of claim 15, wherein the manager server monitors the connection statuses of the one or more cloud servers to update the server setting information including disconnection information of the first cloud server of which a connection status is not identified.

18. A computer readable recording medium in which a program for executing the method claimed in claim 1 is recorded.

* * * * *